United States Patent
Okamoto

(10) Patent No.: US 7,190,737 B2
(45) Date of Patent: Mar. 13, 2007

(54) MULTI-MODE BLOCK-CODED MODULATION/DEMODULATION METHOD

(75) Inventor: Eiji Okamoto, Koganei (JP)

(73) Assignee: National Institute of Information and Communications Technology, Koganei (JP)

( * ) Notice: Subject to any disclaimer, the term of this patent is extended or adjusted under 35 U.S.C. 154(b) by 588 days.

(21) Appl. No.: 10/091,503

(22) Filed: Mar. 7, 2002

(65) Prior Publication Data

US 2003/0067991 A1 Apr. 10, 2003

(30) Foreign Application Priority Data

Sep. 7, 2001 (JP) ............................. 2001-271964

(51) Int. Cl.
*H04L 25/49* (2006.01)
*H04L 5/12* (2006.01)
*H04L 23/00* (2006.01)
*H03M 13/03* (2006.01)

(52) U.S. Cl. ...................... 375/286; 375/264; 375/377; 714/794

(58) Field of Classification Search ................ 375/261, 375/264, 268, 341, 377, 322, 358, 262, 265; 714/794, 795, 786, 792
See application file for complete search history.

(56) References Cited

U.S. PATENT DOCUMENTS

| | | | | |
|---|---|---|---|---|
| 5,175,872 A * | 12/1992 | Borras | ..................... | 455/76 |
| 5,289,501 A * | 2/1994 | Seshadri et al. | ............ | 375/286 |
| 5,394,439 A * | 2/1995 | Hemmati | .................... | 375/242 |
| 5,416,801 A * | 5/1995 | Chouly et al. | .............. | 375/260 |
| 5,541,955 A * | 7/1996 | Jacobsmeyer | ............... | 375/222 |
| 5,644,603 A * | 7/1997 | Ushirokawa | ................ | 375/341 |
| 5,659,578 A * | 8/1997 | Alamouti et al. | ........... | 375/261 |
| 5,724,380 A * | 3/1998 | Ritter | ......................... | 375/135 |
| 5,914,988 A * | 6/1999 | Hu et al. | ..................... | 375/341 |
| 6,108,374 A * | 8/2000 | Balachandran et al. | ..... | 375/227 |
| 6,154,507 A * | 11/2000 | Bottomley | .................. | 375/340 |
| 6,181,952 B1 * | 1/2001 | Murata | ...................... | 455/552.1 |
| 6,252,854 B1 * | 6/2001 | Hortensius et al. | ......... | 370/252 |
| 6,256,339 B1 * | 7/2001 | Kaewell, Jr. | ................ | 375/147 |
| 6,366,763 B1 * | 4/2002 | Ue et al. | ....................... | 455/69 |
| 6,442,146 B1 * | 8/2002 | Onodera et al. | ............ | 370/321 |
| 6,483,881 B1 * | 11/2002 | Kim et al. | ................... | 375/341 |
| 6,745,049 B1 * | 6/2004 | Uchida et al. | .............. | 455/560 |
| 6,813,309 B1 * | 11/2004 | Ogino | ......................... | 375/148 |
| 2002/0126650 A1 * | 9/2002 | Hall et al. | ................... | 370/349 |

FOREIGN PATENT DOCUMENTS

JP          3-283743          12/1991

(Continued)

OTHER PUBLICATIONS

Ungerboeck, "Channel Coding with Multilevel/Phase Signals", IEEE Transactions on Information Theory, vol. IT-28, No. 1, Jan. 1982.*

(Continued)

*Primary Examiner*—Tesfaldet Bocure
*Assistant Examiner*—Vineeta Panwalkar
(74) *Attorney, Agent, or Firm*—Oblon, Spivak, McClelland, Maier & Neustadt, P.C.

(57) ABSTRACT

In digital communications, a multi-mode block-coded modulation/demodulation method carries out adaptive one-way transmission of a multi-mode digital signal by using, between at least two different modes, different settings for level number, level code, set-partitioning method and modulation method that are component elements of a multi-level block-coded modulation system.

5 Claims, 14 Drawing Sheets

MULTI-MODE ENCODER

FOREIGN PATENT DOCUMENTS

| | | |
|---|---|---|
| JP | 3-293743 | 12/1991 |
| JP | 9-130437 | 5/1997 |
| JP | 11-68710 | 3/1999 |
| JP | 11-150571 | 6/1999 |
| JP | 11-355374 | 12/1999 |

OTHER PUBLICATIONS

Imai and Hirakawa, "A New Multilevel Coding Method Using Error-Correcting Codes", IEEE Transactions on Information Theory, vol. IT-23, No. 3, May 1977.*

Lee, "The Advantage of using Repetition code in Mobile Radio Communications", 36th IEEE Vehicular Technology Conference, 1986; vol. 36, May 20-22, 1986 pp. 157-161.*

D. Divsalar, et al., IEEE Transactions on Communications, vol. 36, No. 9, pp. 1004-1012, "The Design of Trellis Coded MPSK for Fading Channels: Performance Criteria", Sep. 1988.

E. Okamoto, et al., Technical Report of IEICE, NW99-254, vol. 99, No. 641, pp. 121-128, "A Study on Block Coded Modulation for Broadband Fixed Wireless Access", Feb. 18, 2000 (with English Abstract).

* cited by examiner

MULTI-MODE ENCODER block diagram trellis diagram

FIG. 5

|  | s1 | s2 | s (L-1) | sL |
|---|---|---|---|---|
| l1 | $c_1$ | $c_1$ | $c_1$ | $c_1$ |
| l2 | $a_1$ | $a_2$ | $a_{L-1}$ | $c_2$ |
| l3 | $a_L$ | $a_{L+1}$ | $a_{2L-2}$ | $a_{2L-1}$ |
| l4 | $a_{2L}$ | $a_{2L+1}$ | $a_{3L-2}$ | $a_{3L-1}$ |

$c_1 = 0$ (mode 1), $1$ (mode 2)

$c_2 = a_1 \oplus a_2 \oplus \cdots\cdots \oplus a_{L-1}$

FIG. 8

|  | $s1$ | $sL'$ | $s(L'+1)$ | $s2L'$ | $s(2L'+1)$ | $s(L-1)$ | $sL$ |
|---|---|---|---|---|---|---|---|
| $l1$ | $0$ | $0$ | $0$ | $0$ | $0$ | $0$ | $0$ |
| $l2$ | $a_1$ ... | $a_{L'}$ | $a_{L'+1}$ ... | $a_{2L'}$ | $a_{2L'+1}$ ... | $a_{3L'-1}$ | $c_1$ |
| $l3$ | $a_{3L'}$ | $a_{4L'-1}$ $a_{4L'}$ | | $a_{5L'-1}$ $a_{5L'}$ | | $a_{6L'-2}$ | $a_{6L'-1}$ |
| $l4$ | $a_{6L'}$ | $a_{7L'-1}$ $a_{7L'}$ | | $a_{8L'-1}$ $a_{8L'}$ | | $a_{9L'-2}$ | $a_{9L'-1}$ | mode 1

|  | $s1$ | $sL'$ | $s(L'+1)$ | $s2L'$ | $s(2L'+1)$ | $s(L-1)$ | $sL$ |
|---|---|---|---|---|---|---|---|
| $l1$ | $0$ | $0$ | $1$ | $1$ | $1$ | $1$ | $1$ |
| $l2$ | $a_1$ ... | $a_{L'}$ | $a_{L'+1}$ ... | $a_{2L'}$ | $a_{2L'+1}$ ... | $a_{3L'-1}$ | $c_1$ |
| $l3$ | $a_{3L'}$ | $a_{4L'-1}$ $a_{4L'}$ | | $a_{5L'-1}$ $a_{5L'}$ | | $a_{6L'-2}$ | $c_2$ |
| $l4$ | $a_{6L'-1}$ | $a_{7L'-2}$ $a_{7L'-1}$ | | $a_{8L'-2}$ $a_{8L'-1}$ | | $a_{9L'-3}$ | $c_3$ | mode 2

|  | $s1$ | $sL'$ | $s(L'+1)$ | $s2L'$ | $s(2L'+1)$ | $s(L-1)$ | $sL$ |
|---|---|---|---|---|---|---|---|
| $l1$ | $1$ | $1$ | $0$ | $0$ | $1$ | $1$ | $1$ |
| $l2$ | $a_1$ ... | $a_{L'}$ | $a_{L'+1}$ ... | $a_{2L'}$ | $a_{2L'+1}$ ... | $a_{3L'-1}$ | $a_{3L'}$ |
| $l3$ |  |  |  |  |  |  |  |
| $l4$ |  |  |  |  |  |  |  | mode 3

|  | $s1$ | $sL'$ | $s(L'+1)$ | $s2L'$ | $s(2L'+1)$ | $s(L-1)$ | $sL$ |
|---|---|---|---|---|---|---|---|
| $l1$ | $1$ | $1$ | $1$ | $1$ | $0$ | $0$ | $0$ |
| $l2$ | $a_1$ ... | $a_{L'}$ | $a_{L'+1}$ ... | $a_{2L'}$ | $a_{2L'+1}$ ... | $a_{3L'-1}$ | $c_1$ |
| $l3$ |  |  |  |  |  |  |  |
| $l4$ |  |  |  |  |  |  |  | mode 4

$$c_1 = a_1 \oplus a_2 \oplus \cdots \oplus a_{3L'-2} \oplus a_{3L'-1}$$
$$c_2 = a_{3L'} \oplus a_{3L'+1} \oplus \cdots \oplus a_{6L'-3} \oplus a_{6L'-2}$$
$$c_3 = a_{6L'-1} \oplus a_{6L'} \oplus \cdots \oplus a_{9L'-4} \oplus a_{9L'-3}$$

mode 1 and 3 mode 2 and 4

MULTI-MODE BLOCK-CODED MODULATION/DEMODULATION METHOD

BACKGROUND OF THE INVENTION

1. Field of the Invention

The present invention relates to a digital communications method that enables one-way multi-mode data transmission with low error characteristics. It particularly relates to a multi-mode block-coded modulation/demodulation method that utilizes unequal and equal error protection in order to send transmissions in which most-significant bits are mixed with other bits.

2. Description of the Prior Art

A first example of the prior art is shown in FIG. 1, which is a block diagram of a conventional one-way adaptive transmission method. In FIG. 1, the preamble carries information such as the number of transmission bits and the data transmission rate. On the receiving side the preamble is read and the necessary number of bits decoded. In the one-way adaptive transmission method of FIG. 1, the preamble is used to adaptively change how the data portion is modulated and decoded. Thus, the method requires the addition to the preamble of information such as the data partition system and the like. If 1) there are errors in the coded information, the data part cannot be correctly decoded even if it is received normally; 2) if preamble coding is used to avoid this, it increases the length of the preamble, decreasing the transmission efficiency; and 3) on the receiving side, in order to decode the received data, it is necessary to provide a plurality of modulators to decode the preamble and switch decoders.

FIG. 2 shows a second example of the prior art. This is a one-way adaptive method in which, depending on the location of the signal points, the modulation system is adaptively changed. In this case, quadrature amplitude modulation (16QAM) and quadrature phase shift keying (QPSK) signal points are used simultaneously to enable series of different bit numbers to be transmitted depending on whether the transmission symbols are sent as 16QAM or as QPSK points, and does not require preamble insertion. In this system, however, the Euclidean distance (d1, d2) between pluralities of adjacent signal points becomes d1<d2, so that in the case of two-bit transmissions, there is a marked degradation in the bit error rate compared to QPSK, so the system has the drawback of lacking practical utility.

Moreover, while not illustrated, as a third example of the prior art, there is the conventional multi-level coded modulation system in which a fixed transmission system is used in designated communications. There are also mobile station communication systems used in mobile unit communications that use a type of phase modulation such as QPSK and fixed data transmission rates.

As described above, the prior art includes problems such as: 1) if there are errors in the coded information the data portion cannot be correctly decoded even if it is received normally; 2) using preamble coding to prevent this happening increases the length of the preamble, thereby decreasing the transmission efficiency; and 3) on the receiving side, in order to decode the received data, it is necessary to provide a plurality of modulators to decode the preamble and switch decoders, resulting in a complex configuration. Also, in the case of a one-way adaptive system in which the modulation method is adaptively changed according to the location of the signal points, a problem is that with two-bit transmissions there is a marked degradation in the bit error rate compared to QPSK, making the system impractical. Moreover, in the case of a multi-level encoding system, a fixed transmission system is used even for mobile station transmission systems, and so a problem is that, in order to maintain the bit error rate, it is not possible to switch communication systems according to the transmission route.

To resolve the above problems, an object of the present invention is to provide a multi-mode block-coded modulation/demodulation method that can be used in the fields of coding systems, modulation systems and coded modulation systems to adaptively change transmission characteristics.

Here, multi-mode transmission refers to transmission effected by changing the component elements of the multi-level coded modulation system according to transmission mode; such elements include the number of code levels, the symbols at each level, the set-partitioning method, modulation method, and so forth. In addition to multi-mode transmission, by combining the block-coded modulation system with Viterbi decoding, the present invention enables the achievement of a high coding gain and good transmission quality.

SUMMARY OF THE INVENTION

For achieving the aforesaid object, the invention provides a multi-mode block-coded modulation/demodulation method that performs one-way transmission of a multi-mode digital signal by using, between at least two different modes, different settings for level number, level code, set-partitioning method and modulation method that are component elements of a multi-level block-coded modulation system.

In one aspect of the invention, modes are changed for each block code frame.

In another aspect of the invention, on the receiving side maximum-likelihood decoding is carried out by a single Viterbi decoder which uses a trellis diagram that includes all modes.

In another aspect of the invention, on the receiving side, mode selection and decoding are carried out simultaneously by performing Viterbi decoding.

In another aspect of the invention, transmission mode information is inserted as an encoded mode index of one or more level codes and other levels are changed in accordance with said mode.

In another aspect of the invention, a mode-index code is used as the highest level code and the code information is used for the first bifurcation in the bit partitioning method.

In another aspect of the invention, a multi-mode system is composed by assigning different bit series to modulation signal points having identical coordinates in a signal space diagram.

In another aspect of the invention, on the encoding side a multi-mode system is composed by assigning different bit series to modulation signal points having identical coordinates in a signal space diagram, and on the decoding side the mode decoding result is used to determine multiple bit series assignments to identical signal points on the signal space diagram.

In another aspect of the invention, multi-mode transmission is carried out in which numbers of transmission symbols are identical to numbers of block code bits.

In another aspect of the invention, a mode-index code is used as the highest level code and on the receiving side the mode is determined by using a multi-level decoding method to decode the highest level, and the decoded signal is used for lower-level decoder switching.

In another aspect of the invention, error-protected transmissions at each level comprise an unequal error protection portion that differs according to mode, and an equal error protection portion.

In another aspect of the invention, when a transmission is from a mobile station in a wireless communications system, transmission modes are switched in accordance with a movement status of the mobile station.

In another aspect of the invention, when a transmission is from a mobile station of a mobile wireless communications system, transmission modes are switched in accordance with a noise environment of the mobile station.

Further features of the invention, its nature and various advantages will be more apparent from the accompanying drawings and following detailed description of the invention.

BRIEF DESCRIPTION OF THE DRAWINGS

FIG. 5 shows the structure of a two-mode block code for unequal error protection and equal error protection.

FIG. 8 shows a four-mode code.

DESCRIPTION OF THE PREFERRED EMBODIMENT

Details of embodiments of the invention are described below with reference to the drawings. First, an example of a preferred configuration of the invention will be described, followed by an explanation of the noise and fading characteristics thereof, based on simulation results.

In accordance with the present invention, there is no need for the preamble used in the above-described first example of the prior art to combine transmission mode index information and data, and the need for extracting and decoding the preamble on the receiving side is also eliminated. Moreover, since a single Viterbi decoder is used for decoding all modes, the present invention also does away with the need to use a plurality of decoders.

In addition, because the invention is a multi-mode transmission method that uses a block-coded modulation system, it can provide the high coding gain that comes from using block-coded modulation, and it also avoids degradation in transmission characteristics such as that described with reference to the above-described second example of the prior art.

Since, moreover, the method of this invention imparts multi-mode characteristics to the block-coded modulation system, unlike in the example of the third prior art described above, the transmission method is not fixed. Instead, the transmission mode can be changed to adapt to various states.

Figure 1:
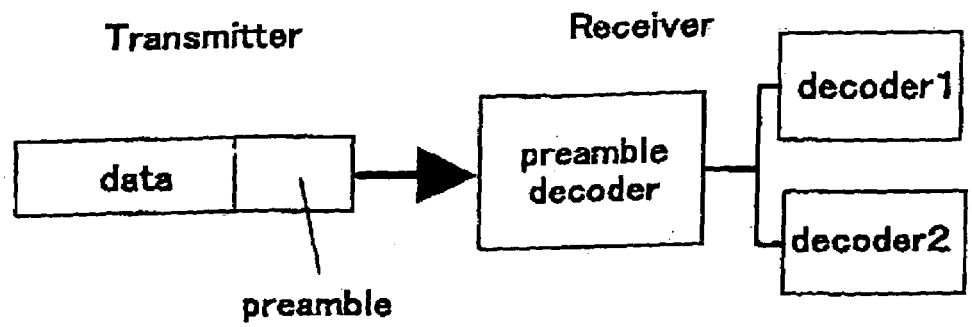
FIG. 1 is a block diagram of a first example of the prior art.
Figure 2:
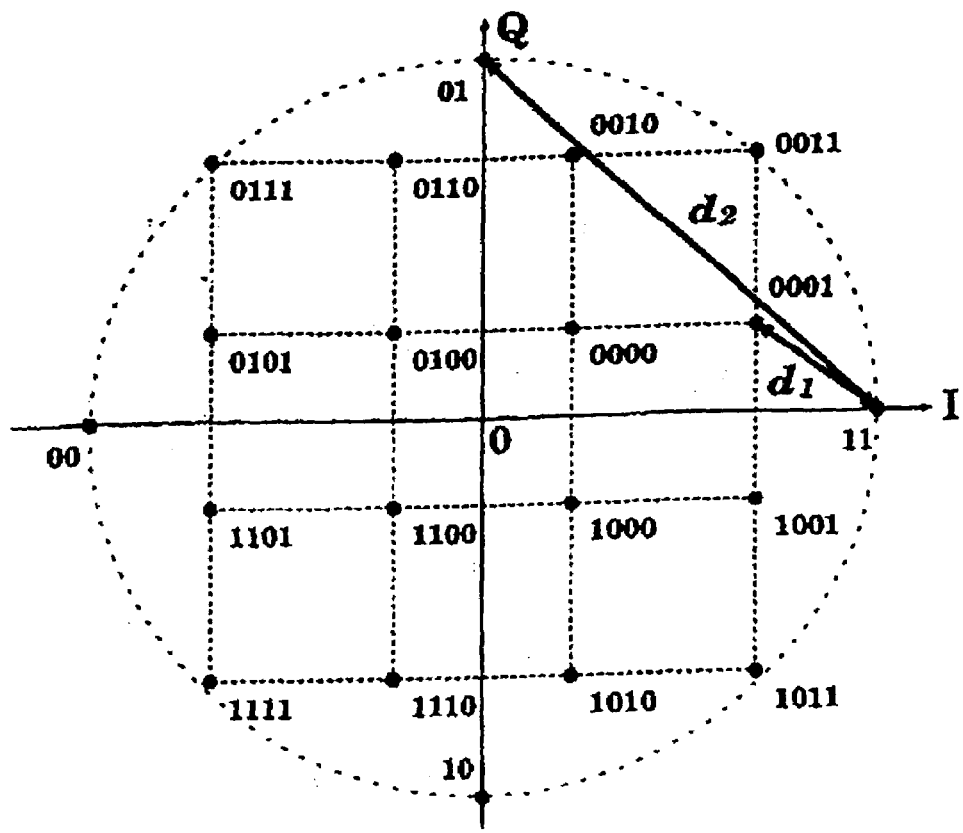
FIG. 2 is a diagram of a second example of the prior art.
Figure 3:
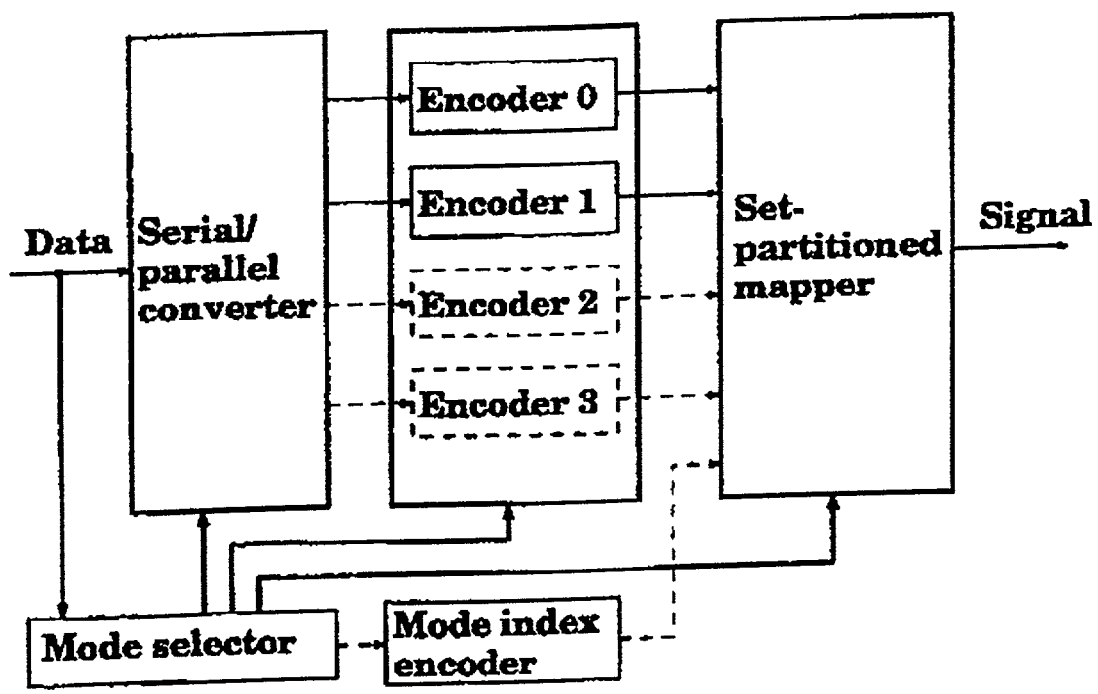
FIG. 3 is a block diagram of a multi-mode encoder.

To explain these points in more detail, FIG. 3 shows a multi-mode encoder that is a type of multi-level encoder. The coding gain is based on the encoder at each level and signal point assignment by the set-partitioning method. In order to generate a transmission series, first the transmission mode is determined, based on the transmission data content, the amount of data, the required transmission quality, and so forth. Based on the mode, changes are made to the number of code levels following serial/parallel (S/P) conversion, the encoder, the modulation system, and the signal point assignment method. The data is then encoded accordingly, to obtain a sending signal. Some or all of the illustrated components can be changed. It is also possible for a transmission mode-index code to be generated and inserted into the transmission series. Doing this extends the Hamming distance between modes, improving the bit error rate (BER) characteristics.

Figure 4A:
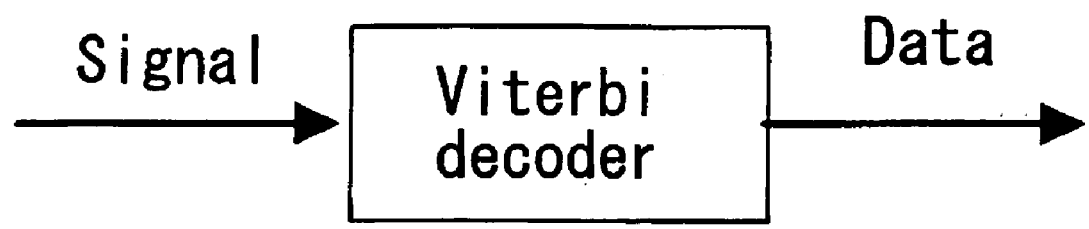
FIG. 4(a) is a diagram of a multi-mode Viterbi decoder.
Figure 4B:
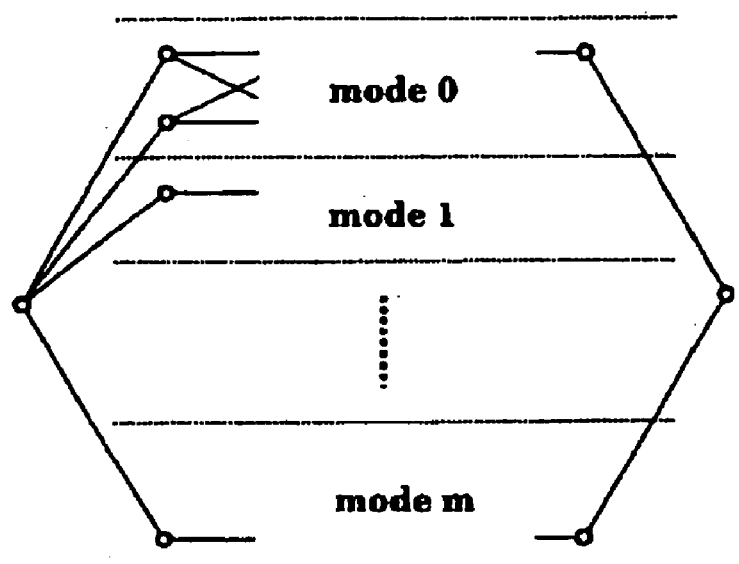
FIG. 4(b) is a trellis diagram used by the decoder.

FIG. 4 shows a Viterbi decoder used on the receiving side, and the trellis diagram the Viterbi decoder uses for the decoding. Thus, maximum-likelihood decoding is carried out when all transmission series modes and generated bit probability are equal. The number of trellis states is determined by the multi-level code depth and each multi-level code. When code words include a transmission mode-index code, the trellis diagram can be divided into sub-trellis areas by index code word, as shown in FIG. 4(b).

In accordance with the code word composition, there may be separation, conjunction and crossover between the sub-trellis areas. If there is no mode-index code, the trellis will have the same configuration used in a normal multi-level coded modulation system. Except for the fact that the modulation system and signal point assignment method have the same plurality of modes as on the transmitting side, the Viterbi decoding method of this system is the same as a conventional such method.

One-way multi-mode adaptive transmission is realized by means of the above system. Since this system is substantially the same as a configuration comprising a conventional multi-level block-coded modulation system and Viterbi decoder, it can be readily achieved.

Figure 6:
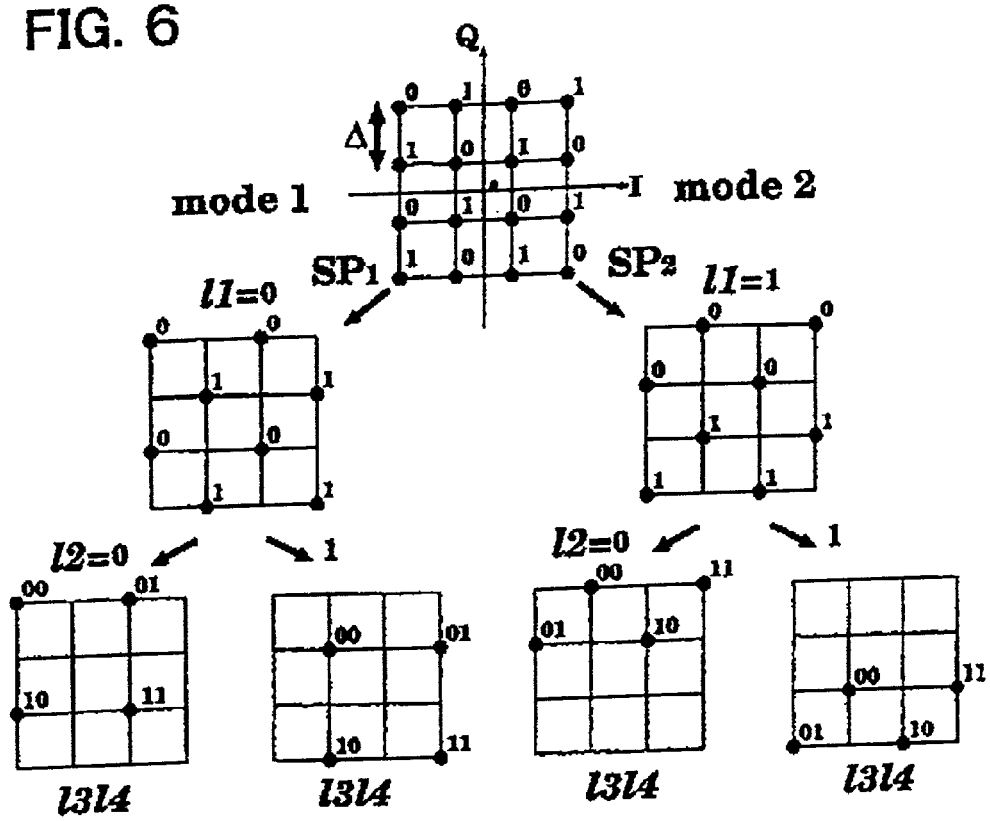
FIG. 6 illustrates a hybrid set-partitioning method.

Next, this method will be described with reference to two code modes, one with stronger error protection at certain levels and one with equal error protection. FIG. 5 shows a multi-level code defined by length L, hereinafter referred to as code 1. Code 1 is a four-level code with two modes. Code l1 is a mode-index code that is a repetition code of zeros or ones with Hamming distance L. Using (N, K, d) to describe the number of bits (N), the number of information bits (K) and the Hamming distance (d), code l2 is a (L, L-1, 2) parity check code, and codes l3 and l4 are uncoded (L, L, 1) codes. FIG. 6 shows the set-partitioning method used for multi-mode transmission implanted with equal error protection and unequal (stronger) error protection for code l2. A 16QAM system is used. Because l1 is a mode-index code, the first bifurcation corresponds to the mode. After l1, the set-partitioning method is divided into SP1 for mode 1 and SP2 for mode 2. SP1 is a conventional set-partitioning in which the Euclidean distance between signal points doubles in proportion to the code level, which SP2 is set to extend the average distance between signal points of l2. Therefore, unequal error protection can be achieved by sending the mode-2 code. Table 1 below lists the code distance charac-

TABLE 2

|  | Mode 1 | mode 2 | mode 3 | mode 4 |
|---|---|---|---|---|
| code level | 4 | 4 | 2 | 2 |
| I1 code | | mode-index code | | |
| I2 code | | (L, L-1, 2) | | |
| I3 and I4 code | (L, L, 1) | (L, L-1, 2) | — | — |
| modulation | 16QAM | | QPSK | |
| signal partition | SP1 | SP2 | SP1 | SP2 |
| trans. rate (bit/sym) | $\frac{3L-1}{L}$ | $\frac{3L-3}{L}$ | 1 | $\frac{L-1}{L}$ |
| MSED between different modes | $4\Delta^2$ | $4\Delta^2$ $2L/3$ | $2L\Delta^2/3$ $9\Delta^2$ | $18\Delta^2$ |
| MSED between same modes | 1 | 2 | 1 | 2 |
| MSD between different modes | | $(2L\Delta^2/3)^{2L/3}$ | | |
| MSD between same modes | $4\Delta^2$ | $16\Delta^4$ | $9\Delta^2$ | $324\Delta^4$ |
| MPD between different modes | | | | |
| MPD between same modes | | | | | teristics, where Δ is the distance between the 16QAM signal points shown is FIG. 6. MSED is Minimum Squared Euclidean Distance; a higher MSED indicates better bit error characteristics in a white noise environment. MSED, and the MSD. Minimum Symbol Distance, and MPD, Minimum Product Distance, are referred to herebelow. In Table 1 below, the average MSED of l2 is in the same mode when the generation of codes is equally likely. The mode-2 value is 1.5 times as large as that in mode 1. From here, the improvement in the l2 transmission characteristics of mode 2 will be understood.

TABLE 1

|  | Mode1 | mode 2 |
|---|---|---|
| code level | 4 | |
| 11 code | mode-index code | |
| 12 code | (L, L – 1, 2) | |
| 13 and 14 code | (L, L, 1) | |
| modulation | 16QAM | |
| signal partition | SP1 | SP2 |
| trans. rate (bit/sym) | (3L – 1)/L | |
| MSED between different modes | $L\Delta^2$ | |
| same-mode MSED of 12 | $4\Delta^2$ | $4\Delta^2$ |
| average same-mode MSED of 12 | $4\Delta^2$ | $6\Delta^2$ |

Figure 7:
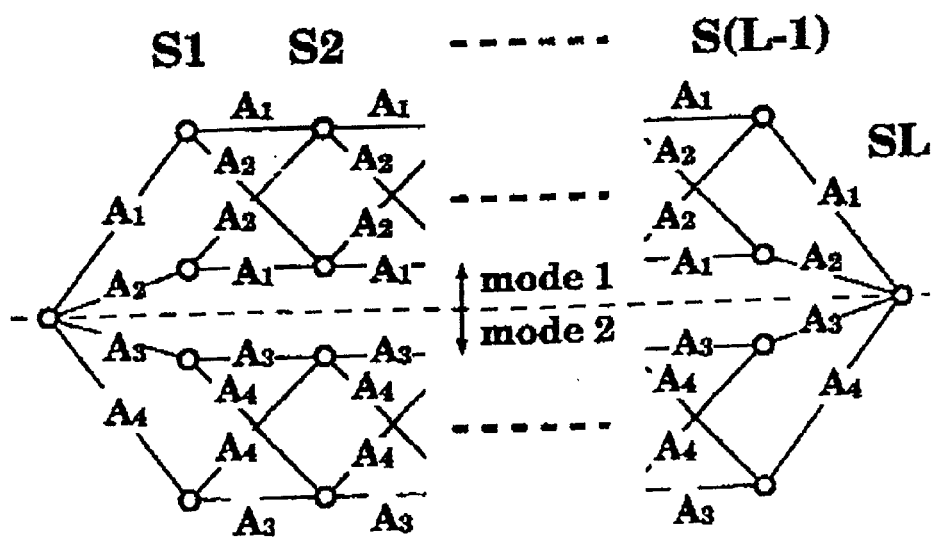
FIG. 7 is a code 1 trellis diagram.

Code 1 decoding is carried out by Viterbi decoding using the trellis diagram shown in FIG. 7. The output labels of A1 to A4 in the diagram are the signal point sets having the same branch rules, as follows.
A1=(0000, 0001, 0011), A2=(0100, 0101, 0110, 0111),
A3=(1000, 1001, 1011), A4=(1100, 1101, 1110, 1111).

Because this trellis diagram has all states of modes 1 and 2, multi-mode decoding can be carried out simply by performing the Viterbi decoding. Thus, this method simplifies multi-mode decoding.

Next is shown a code with a transmission rate that can be varied according to the mode, and which can be used in Gaussian noise and fading noise environments. Hereinbelow this is referred to as code 2. FIG. 8 shows a block code with code length L, where L=3L'. This block code has four transmission modes. With the frame using the same L symbols, the number of transmitted bits and the code distance characteristics can be changed. Code characteristics are listed in Table 2 below.

Here, l1 is a mode-index code which is a repetitive parity code with a 2L/3 Hamming distance. In all modes, l2 is an (L, L-1, 2) single-parity check code. l3 and l4 are only sent in modes 1 and 2. The transmission rate differs markedly between modes 1 and 2, and modes 3 and 4, because of the difference between l3 and l4. MSD, which is Minimum Symbol Distance, and MPD, which is Minimum Product Distance, are parameters for evaluating a coed in a high- and a low-SNR (Signal/Noise Ratio) fading environment. In each case, a higher value indicates better transmission characteristics.

Because, as shown in Table 2, transmission rate and MSD change according to the mode, transmissions with different characteristics are possible. Since the MSD in modes 2 and 4 is 2, in a fading environment the transmission characteristics in those modes will be better than in modes 1 and 3. Thus, modes 2 and 4 would be used for mobile communications. Also, compared to modes 3 and 4, transmission rates are higher in modes 1 and 2, so it would be better to use modes 1 and 2 when a high transmission rate is the object. Conversely, as can be seen from the MSED, in a Gaussian noise environment, better characteristics are achieved in modes 3 and 4 than in modes 1 and 2, so modes 3 and 4 can be used when it is desired to improve the bit error rate (BER) characteristics.

Figure 9:
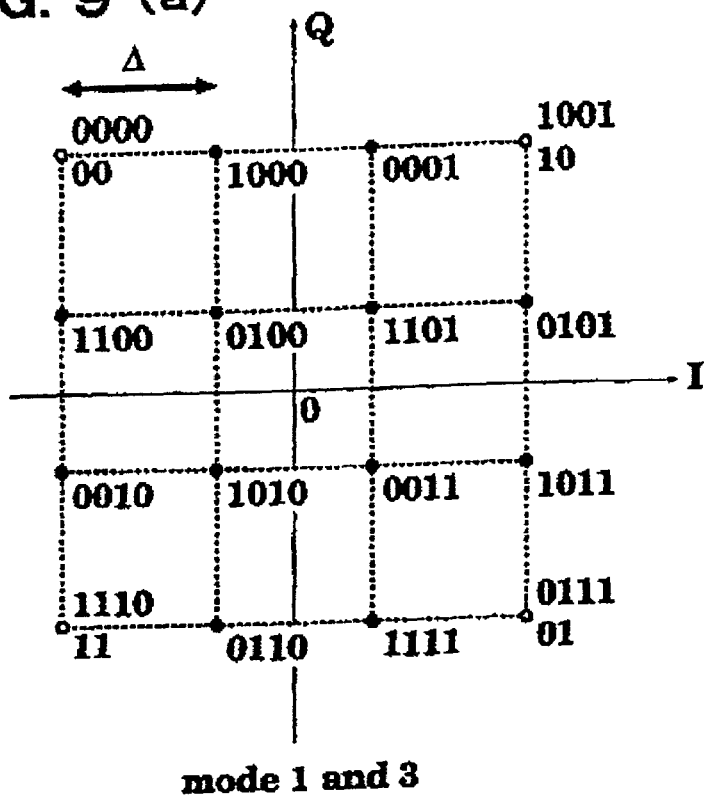
FIG. 9 illustrates set-partitioned, multiple-assigned 16QAM signal points, for modes 1 and 3 in the case of FIG. 9(a) and for modes 2 and 4 in the case of FIG. 9(b).
Figure 9:
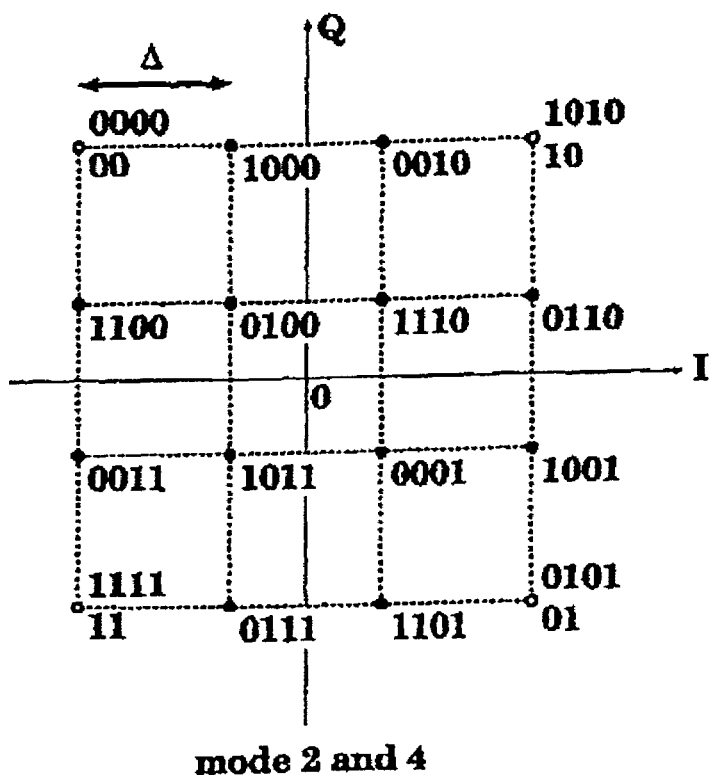
Figure 10:
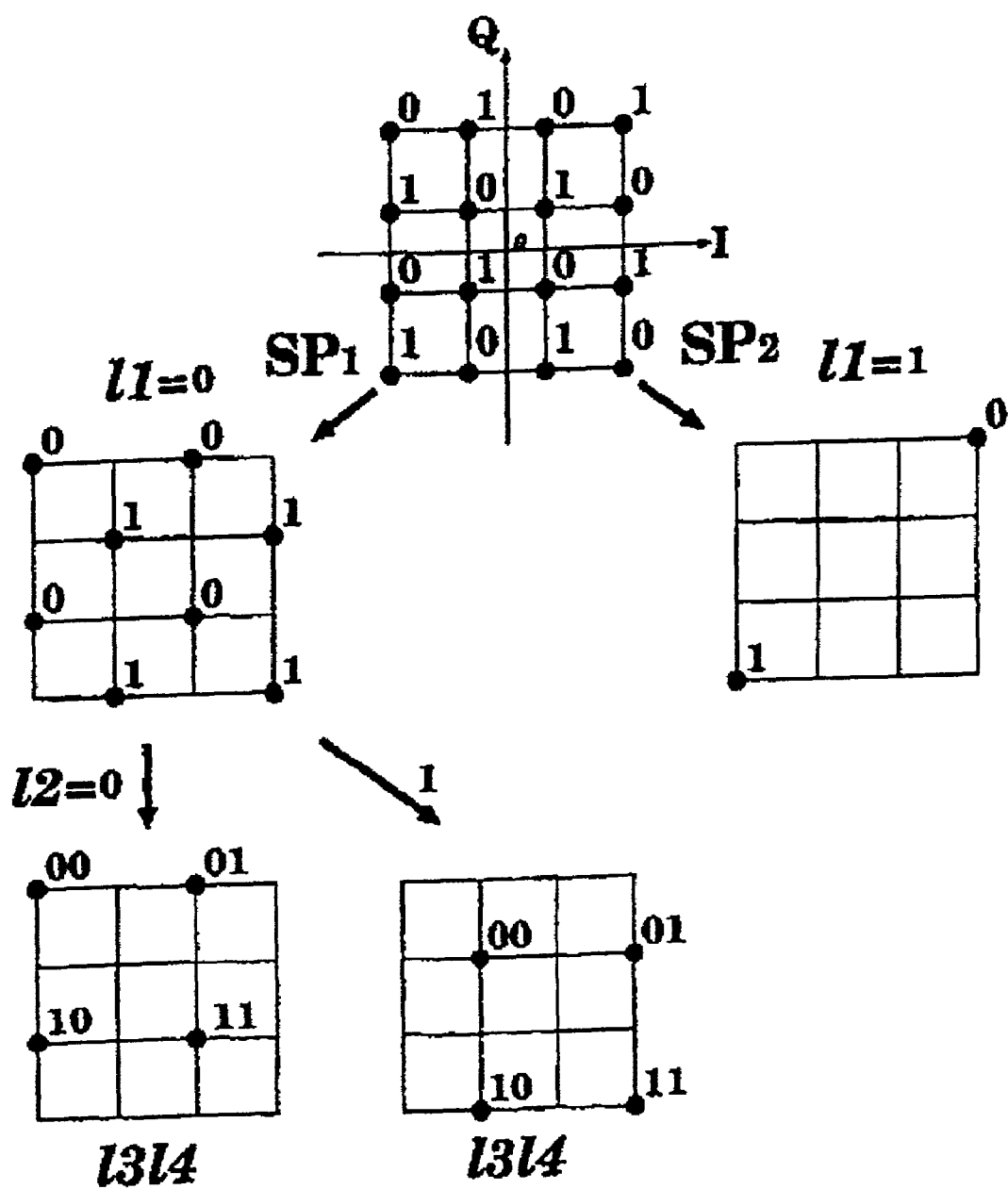
FIG. 10 illustrates the set-partitioning method in modes 1 and 3.
Figure 11:
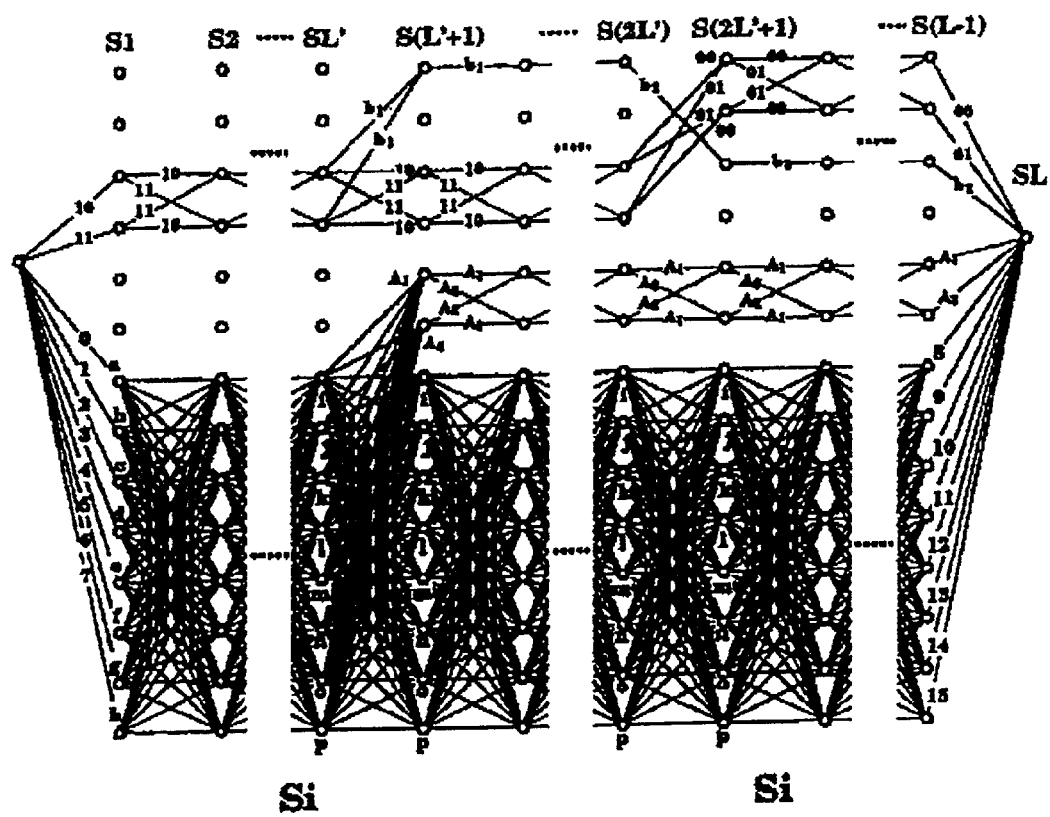
FIG. 11 is code 2 trellis diagram.

FIG. 9 shows 16QAM signal point assignments used for code 2. Because the 16QAM and QPSK signal points are stacked, the overall modulation is carried out using only the 16QAM signal plane. This can also be done using a mode-index code and changing the set-partitioning for each mode. In accordance with this method, by using the mode-index code to extend the distance between different modes and using a different set-partitioning for each mode for that point, it is possible to maintain the distance between code words even in a multiple-assigned signal configuration. FIG. 10 shows the set-partitioning method used in modes 1 and 3. After l1, branching according to mode is possible. This can also be done with respect to modes 2 and 4. As a result, the set-partitioned, multiple-assigned 16QAM signal point configuration of FIG. 9 can be obtained. Code 2 deciding is carried out by Viterbi decoding using the trellis diagram show in FIG. 4(*b*). Because a mode-index code is used, the trellis diagram can be divided into sub-trellis areas for each code. In FIG. 11, A1 and A2 are the same as in code1, b1=(00, 01) and b2=(10, 11).

Figure 12:
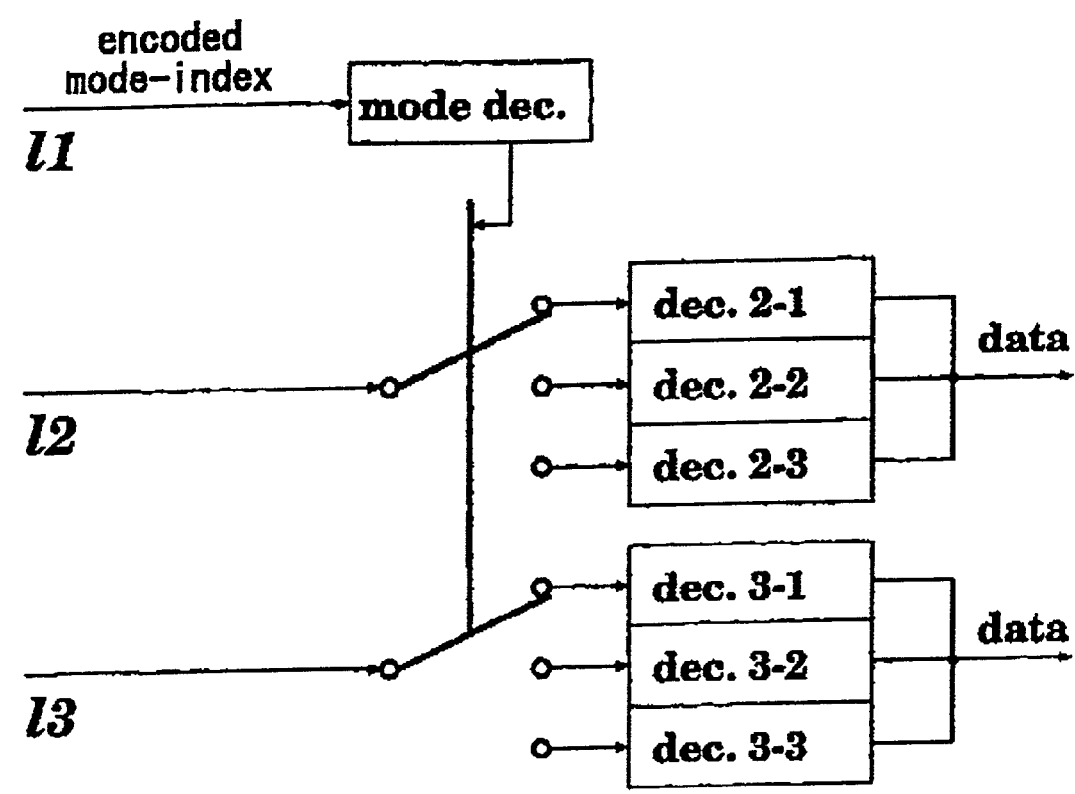
FIG. 12 is a block diagram of a multistage decoder.

In the above description the use of Viterbi decoding is assumed. However, other methods, such as a multistage decoding method or the like, can be used to carry out the multi-level block-coded modulation. FIG. 12 shows a multistage decoder configuration for that purpose. First, the mode-index code is decoded to determine the mode. Following this, the decoding method for other levels is determined and the decoding carried out. Although this is not maximum-likelihood decoding, the decoder configuration is easy to implement.

Figure 13:
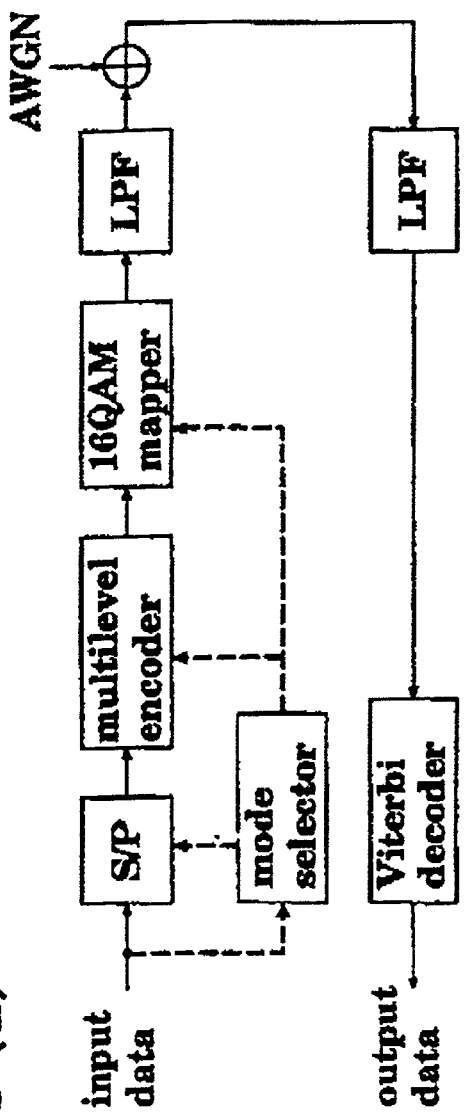
FIG. 13 is a block diagram of an equivalent baseband system for Gaussian noise environments (FIG. 13(a)) and for fading noise environments (FIG. 13(b)).
Figure 13:
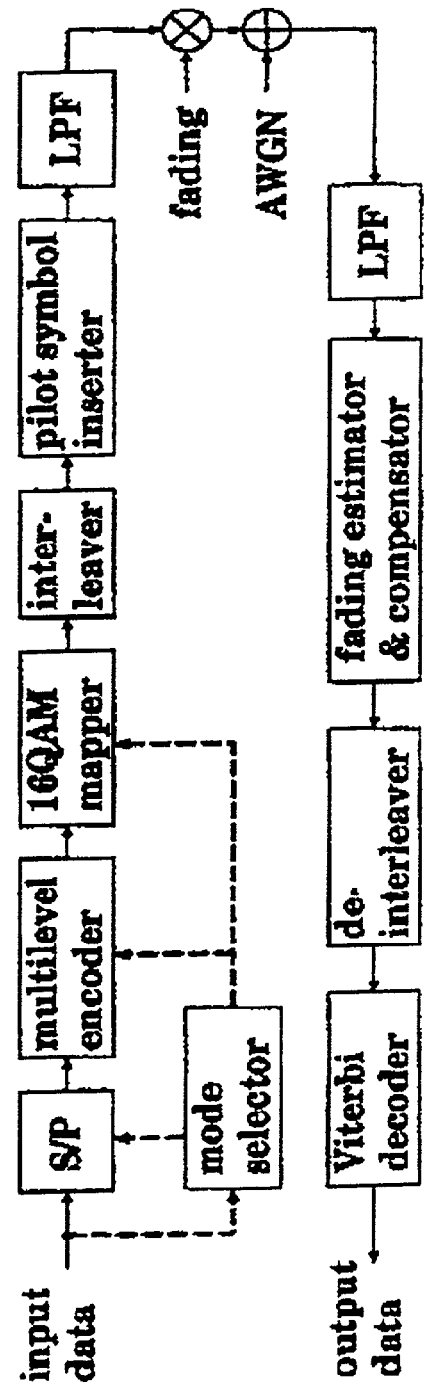
Figure 14:
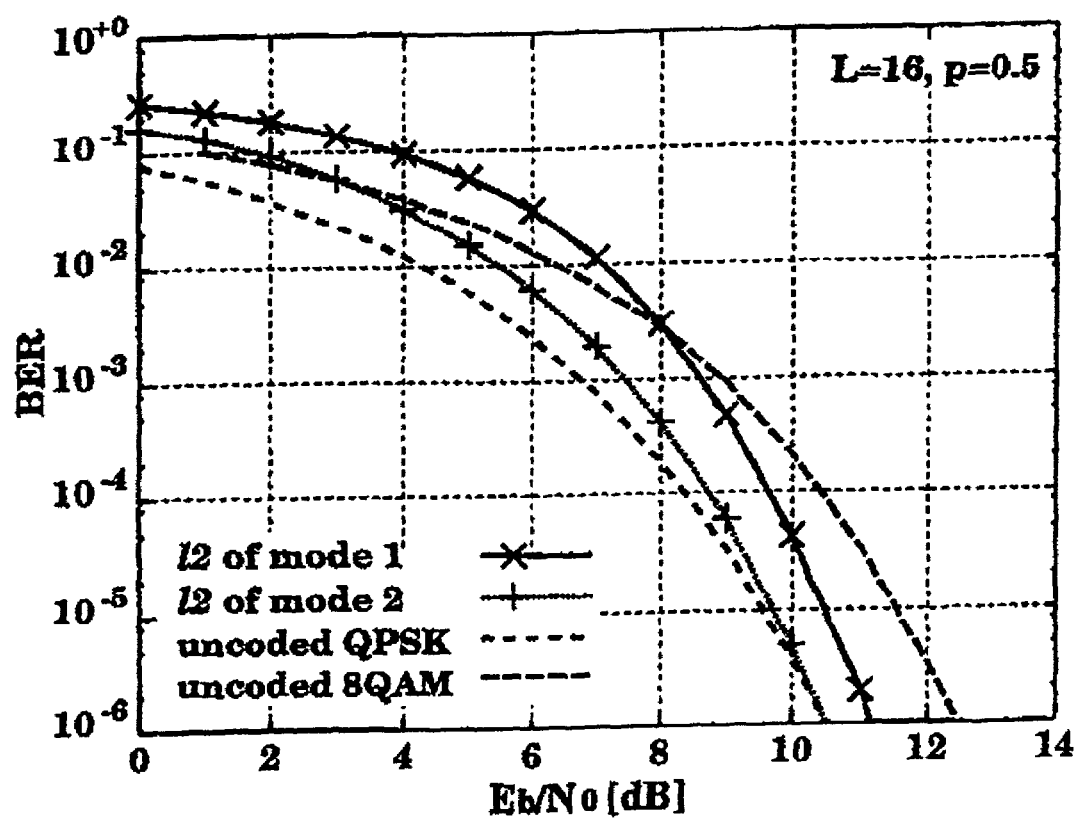
FIG. 14 shows simulation results for code 1 bit error rate characteristics in modes 1 and 2.

To examine the noise characteristics of a system using the method of the invention, the 12 characteristics of code 1 in a Gaussian noise environment were obtained by computer simulation using the system shown in FIG. 13(a). On the receiving side, it is assumed that there is perfect symbol timing and frame synchronization. FIG. 14 shows the BER of 12 with an L of 16 and a generation probability of 0.5 for both mode 1 and mode 2. From FIG. 14, it can be seen that in mode 2, the BER is improved. The results agree with the above-described distance characteristics.

To examine the noise characteristics and fading characteristics of a system using the method of the invention, the BER characteristics of code 2 in an additive white Gaussian noise (AWGN) and fading environment were calculated using the system shown in FIG. 13(b). With an L of 15, it was assumed that the generation probabilities of modes 1 to 4 were, respectively, 0.45, 0.45, 0.05, and 0.05.

Figure 15:
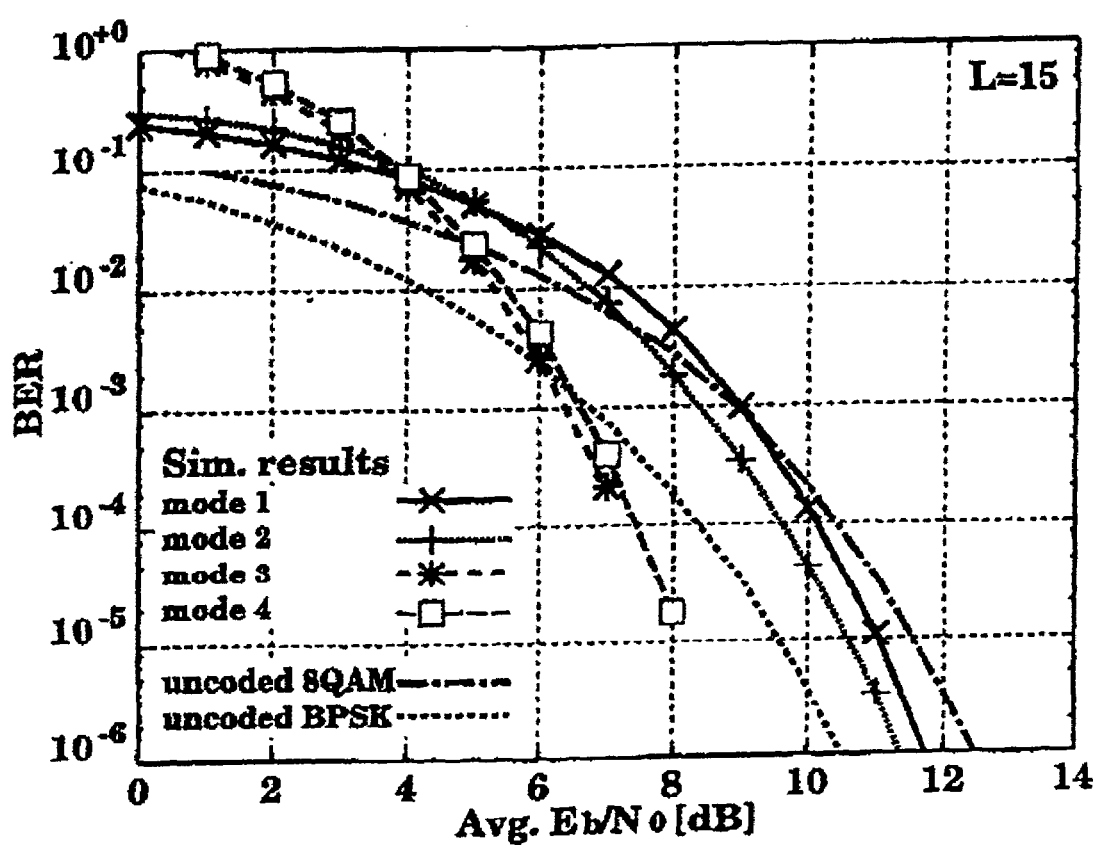
FIG. 15 shows simulation results for code 2 bit error rate characteristics in a Gaussian noise environment.

FIG. 15 shows the BER in an AWGN environment. For calculation purposes, with respect to transmitted series, over-and-short bits at the receiving end arising from mode error were counted as error bits. This meant that the BER could be more than one. With respect to the ratio Eb/N0, where Eb is the transmitted power per information bit (before encoding) and N0 is the noise power spectrum density, below a certain Eb/N0, compared to transmission rates of uncoded series, in every mode a coding gain was obtained, indicating the achievement of both the high gain provided by code modulation and multi-mode transmission. As can be seen from FIG. 15, in modes 3 and 4 the average transmission rate decreases but the BER characteristics improve.

Figure 16:
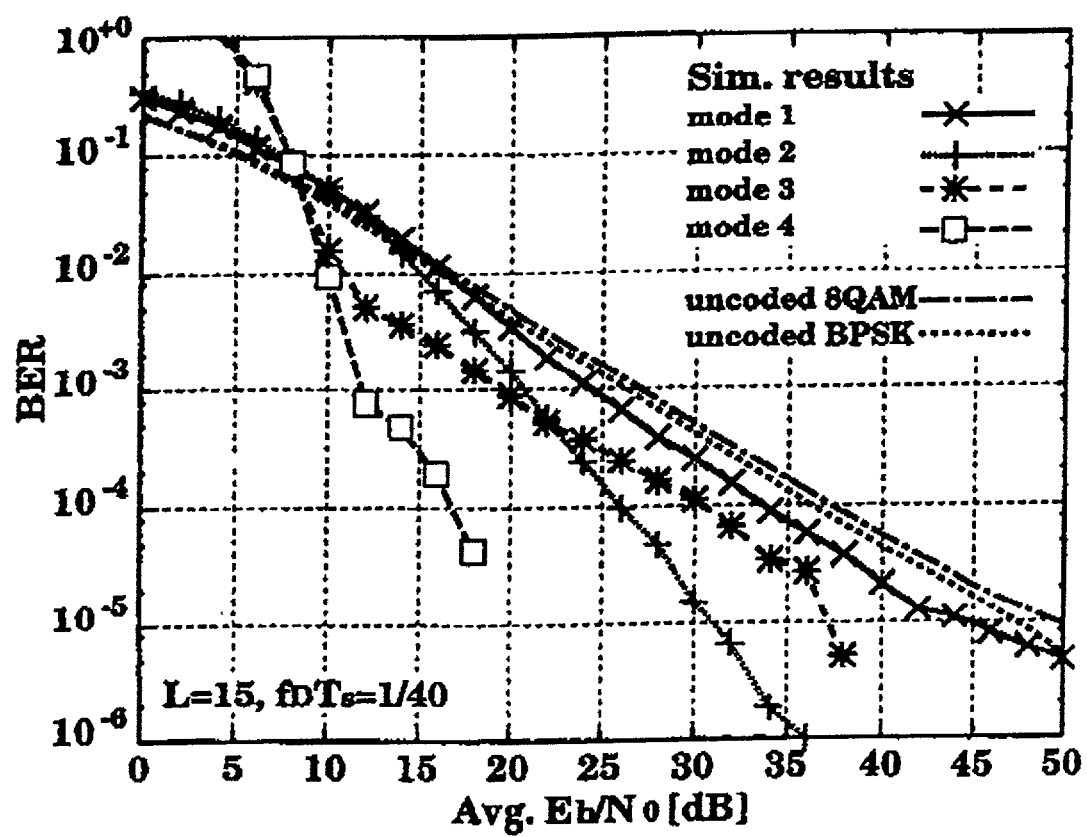
FIG. 16 shows simulation results for code 2 bit error rate characteristics in a fading noise environment.

Next, the BER characteristics in a fading environment were calculated. FIG. 16 shows the BER characteristics in a Rayleigh fading environment in which the normalized fading pitch was set at a relatively fast 1/40. As shown, the transmission characteristics of modes 2 and 4 were greatly improved. Therefore, for uplinks in mobile communication systems, adaptive transmission can be realized such as by using modes 1 and 3 when a mobile station is at rest and modes 2 and 4 when the mobile station is moving. At the same time, transmission rates can be changed by a considerable degree depending on whether modes 1 and 2 or modes 3 and 4 are used. Moreover, modes can be switched according to the length of each code, enabling rapid adaptation to changes in communications environments, ensuring efficient transmissions.

With the present invention, there is no need for the preamble used, in the above-mentioned first example of the prior art, to combine transmission mode index information and data, and there is also no need to extract and decode the preamble on the receiving side. Also, a single Viterbi decoder is used for decoding in all modes, eliminating the need to use multiple decoders. In addition, because the invention is a multi-mode transmission method that uses block-coded modulation, it provides the high coding gain of the block-coded modulation method and also avoids the type of degradation in transmission characteristics described with reference to the second example of the prior art. Moreover, the invention imparts multi-mode characteristics to the block-coded modulation, enabling transmission modes to be adaptively changed according to the system states. The invention also utilizes unequal and equal error protection that makes it possible to send transmissions containing a mixture of most-significant bits and other bits.

What is claimed is:

1. A multi-mode block-coded modulation/demodulation method for a transmission system equipped with a multi-mode encoder and a multi-mode decoder, comprising the steps of:
    determining a transmission mode based on transmission data contents, an amount of data and a required transmission quality;
    making changes to a number of code levels, the multi-mode encoder, a modulation system and a signal point assignment method based on the mode;
    encoding the data to obtain a signal;
    sending the signal;
    receiving the signal;
    determining a number of trellis states;
    decoding the received signal using maximum-likelihood decoding;
    inserting information on a transmission mode in a multi-mode digital signal using one or more codes of levels as an encoded mode index or indices; and
    changing codes of other levels according to the transmission mode.

2. A method according to claim 1, further comprising using a mode-index code as a highest level code and using the highest level code for a first bifurcation in a set-partitioning method.

3. A multi-mode block-coded modulation/demodulation method for a transmission system equipped with a multi-mode encoder and a multi-mode decoder, comprising the steps of:
    determining a transmission mode based on transmission data contents, an amount of data and a required transmission quality;
    making changes to a number of code levels, the multi-mode encoder, a modulation system and a signal point assignment method based on the mode;
    encoding the data to obtain a signal;
    sending the signal;
    receiving the signal;
    determining a number of trellis states;
    decoding the received signal using maximum-likelihood decoding; and
    assigning different bit series to each of identical signal points for different modulation in a signal space diagram to compose a multi-mode system.

4. A method according to claim 1, further comprising the steps of assigning different bit series to each of identical signal points for different modulation in a signal space diagram to compose a multi-mode system on an encoding side, and on a decoding side using a mode decoding result to determine multiple bit series assignments to identical signal points on a signal space diagram.

5. A method according to claim 1, further comprising the steps of using a mode-index code as a highest level code and, decoding the highest level code using a multistage decoding method to determine a mode and using a decoded signal for lower-level decoder switching in the multistage decoding method.

* * * * *